United States Patent Office 3,752,887
Patented Aug. 14, 1973

3,752,887
METHOD OF COMBATTING FUNGI USING DIMETHYL 1,2,5-THIADIAZOL-3-YL PHOSPHATE
James Billet, Rochester, N.Y., and Stanley T. D. Gough, Branchburg, N.J., assignors to Mobil Oil Corporation
No Drawing. Continuation-in-part of application Ser. No. 813,270, Apr. 3, 1969. This application Apr. 14, 1972, Ser. No. 244,261
Int. Cl. A01n 9/12, 9/22, 9/36
U.S. Cl. 424—200                                1 Claim

ABSTRACT OF THE DISCLOSURE

Phosphate, phosphorothionate, phosphonate, and phosphonothionate esters of 3-hydroxy-1,2,5-thiadiazole and its substituted derivatives are provided, specifically dimethyl 1,2,5-thiadiazolyl phosphate. The latter compound has fungicidal activity.

CROSS REFERENCE TO RELATED APPLICATIONS

This application is a continuation-in-part of copending application Ser. No. 813,270, filed Apr. 3, 1969.

BACKGROUND OF THE INVENTION

Field of the invention

This invention is concerned with phosphate esters of 3-hydroxy-1,2,5-thiadiazoles and their use as fungicides.

Description of the prior art

Phosphate esters of hydroxy-2,1,3-benzothiadiazole have been described as insecticides in British Pat. No. 886,587. Some of the compounds of this invention have been disclosed in South African application 68/2,333, opened on Sept. 10, 1968.

SUMMARY OF THE INVENTION

The present invention provides insecticidal compounds having the formula:

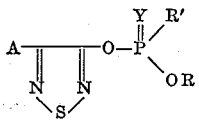

wherein Y is oxygen or sulfur, R is hydrogen, alkyl ($C_1$–$C_5$), alkenyl ($C_2$–$C_6$), cycloalkyl ($C_3$–$C_6$), aryl, haloalkyl ($C_1$–$C_5$), haloalkenyl ($C_2$–$C_6$), or haloaryl, R' is alkyl ($C_1$–$C_5$), or alkoxy ($C_1$–$C_5$), and A is R, dialkylamino, nitro, halogen, alkoxycarbonyl, acyl, alkoxy, alkylthio, alkylsulfonyl, thiocyano, or cyano. It also provides insecticidal compositions comprising one or more of these compounds and a carrier therefor, and the use of such compounds for combatting insects. Specifically, dimethyl 1,2,5-thiadiazolyl phosphate is a new compound having both insecticidal and fungicidal activity.

DESCRIPTION OF SPECIFIC EMBODIMENTS

The compounds of this invention are readily prepared by reacting an alkali metal (Na, K, Li) salt of 3-hydroxy-1,2,5-thiadiazole or a 4-substituted (A as aforedefined) derivative thereof with a phosphorochloridate or phosphonochloridate, or phosphorochloridothionate, or phosphonochloridothionate ester with the desired R and R' substituents as aforedefined.

The 3-hydroxy-1,2,5-thiadiazole and its derivatives are prepared by the methods of Weinstock et al., J. Org. Chem., 32, 2823 (1967) and of the references cited therein. In general, the authors state:

"We have found that the methods of formation of this aromatic ring system by cyclization reactions encompass several classes of acyclic compounds and that a general model for the structure of aliphatic systems suitable for 1,2,5-thiadiazole syntheses can be devised. This model is defined in terms of an acyclic NCCN grouping in which the N-C functions are varied over the oxidation levels of amine, imine, cyanide, and oxime. Aliphatic compounds which contain these functionalities in any combination react with sulfur monochloride or, in some cases, sulfur dichloride to form an appropriately substituted 1,2,5-thiadiazole.

"Based on this model, a large number of readily available acyclic compounds can be constructed which serve as starting materials in these syntheses, e.g., α-diamines, α-aminonitriles, alkyl cyanoformimidates, α-amino acid amides, α-aminoamidines, dialkyl oxalimidates, alkyl oxamimidates, α-dioximes, α-isonitrosoamides, and α-isonitrosonitriles. The data now at hand indicate that, with few exceptions, the reactions of these classes of compounds are general over a range of substituents. In addition, two unique starting materials, cyanogen and 1-cyanoformamide, are based on the model described above. The various acyclic compounds employed in these reactions and the derived 1,2,5-thiadiazoles are summarized in Table I.

"The yields in these reactions range from about 30 to 90%, depending on the nature of the starting material. The reactions proceed readily at room temperature except in the case of the α-diamine hydrochlorides where slightly elevated temperatures are employed. Since most of the products are volatile, they are readily obtained in a state of high purity by steam distillation of the reaction mixture. The nonvolatile products (hydroxy and amino derivatives) are isolated by ether extraction of the water-quenched reaction mixture. Dimethylformamide is the solvent of choice and generally a 100% M excess of sulfur monochloride is employed. The stoichiometry of sulfur monochloride is calculated as 1 mole equiv. for insertion of the ring sulfur plus 1 mole equiv. for each degree of oxidation required to obtain the aromatic form of the ring."

Non-limiting examples of the phosphate, phosphonate, phosphorothionate, and phosphonothionate esters of this invention are:

dimethyl 1,2,5-thiadiazol-3-yl phosphate
diethyl 1,2,5-thiadiazol-3-yl phosphate
dimethyl 1,2,5-thiadiazol-3-yl phosphorothionate
diethyl 1,2,5-thiadiazol-3-yl phosphorothionate
dimethyl 4-ethoxy-1,2,5-thiadiazol-3-yl phosphate
diethyl 4-ethoxy-1,2,5-thiadiazol-3-yl phosphate
diethyl 4-ethoxy-1,2,5-thiadiazol-3-yl phosphorothionate
dimethyl 4-chloro-1,2,5-thiadiazol-3-yl phosphate
diethyl 4-chloro-1,2,5-thiadiazol-3-yl phosphate
dimethyl 4-ethylthio-1,2,5-thiadiazol-3-yl phosphate
diethyl 4-ethylthio-1,2,5-thiadiazol-3-yl phosphate
dimethyl 4-ethylthio-1,2,5-thiadiazol-3-yl phosphorothionate
diethyl 4-ethylthio-1,2,5-thiadiazol-3-yl phosphorothionate
diethyl 4-cyano-1,2,5-thiadiazol-3-yl phosphate
diallyl 1,2,5-thiadiazol-3-yl phosphate
dicyclohexyl 1,2,5-thiadiazol-3-yl phosphate
di(bromopropyl) 1,2,5-thiadiazol-3-yl phosphate
di(chlorophenyl) 1,2,5-thiadiazol-3-yl phosphate
divinyl 1,2,5-thiadiazol-3-yl phosphorothionate
dicyclopropyl 1,2,5-thiadiazol-3-yl phosphorothionate
diphenyl 1,2,5-thiadiazol-3-yl phosphorothionate
di(bromophenyl) 1,2,5-thiadiazol-3-yl phosphorothionate
diethyl 4-butyl-1,2,5-thiadiazol-3-yl phosphate
diethyl 4-vinyl-1,2,5-thiadiazol-3-yl phosphate
diethyl 4-phenyl-1,2,5-thiadiazol-3-yl phosphate diethyl 4-cyclohexyl-1,2,5-thiadiazol-3-yl phosphate
diethyl 4-dimethylamino-1,2,5-thiadiazol-3-yl phosphate
diethyl 4-nitro-1,2,5-thiadiazol-3-yl phosphate
diethyl 4-bromo-1,2,5-thiadiazol-3-yl phosphate
diethyl 4-ethoxycarbonyl-1,2,5-thiadiazol-3-yl phosphate
diethyl 4-propionyl-1,2,5-thiadiazol-3-yl phosphate
diethyl 4-butoxy-1,2,5-thiadiazol-3-yl phosphate
diethyl 4-thiocyano-1,2,5-thiadiazol-3-yl phosphate
methyl 1,2,5-thiadiazol-3-yl ethanephosphonate
ethyl 1,2,5-thiadiazol-3-yl pentanephosphonate
cyclohexyl 1,2,5-thiadiazol-3-yl butanephosphonothionate
phenyl 1,2,5,4-ethoxy-1,2,5-thiadiazol-3-yl ethanephosphonothionate In the following examples the preparation of typical compounds of this invention are demonstrated and their effectiveness as insecticides is shown.

EXAMPLE 1

Diethyl 1,2,5-thiadiazol-3-yl phosphate

An aqueous solution (15 ml.) of potassium carbonate (4.8 g., 35 mmole) was added to 3-hydroxy-1,2,5-thiadiazole (7.0 g., 69 mmole) slurried in benzene (250 ml.) The water was removed as the azeotrope and collected in a Dean-Stark trap. Diethylphosphorochloridate (10.9 g., 62 mmole) was then added and the reaction mixture refluxed 16 hours. The consumption of diethylphosphorochloridate was confirmed by vapor phase chromatography. The cooled reaction mixture was filtered, washed twice with water (100 ml.) and dried over sodium sulfate. Evaporation of the solvent yielded 1,2,5-thiadiazol-3-yl diethyl phosphate, a pale yellow oil (8.3 g.). The structure was supported by its NMR spectrum (neat), exhibiting multiplets centered at $\delta$ 1.12 (6H) and $\delta$ 4.10 (4H) and a sharp singlet at $\delta$ 8.35 (1H).

EXAMPLE 2

Diethyl 4-cyano-1,2,5-thiadiazol-3-yl phosphate

The procedure of Ross and Smith [J. M. Ross and W. C. Smith, J. Org. Chem., 86, 2861 (1964)] was used to prepare the potassium salt of 4-cyano-3-hydroxy-1,2,5-thiadiazole. The potassium salt (10 g., 61 mmole) was slurried in benzene (250 ml.), and dried by azeotropic distillation. Diethylphosphorochloridate (8.6 g., 50 mmole) was then added and the reaction mixture refluxed three days. The consumption of diethylphosphorochloridate was confirmed by vapor phase chromatography. The cooled reaction mixture was filtered, washed with water, (100 ml.), and dried over sodium sulfate. Evaporation of the solvent yielded 4-cyano-1,2,5-thiadiazol-3-yl diethyl phosphate, a red oil (5.5 g.). The structure was supported by its NMR spectrum (CDCl$_3$), exhibiting multiplets at $\delta$ 1.42 (6H) $\delta$ 4.20 (4H).

EXAMPLES 3 THROUGH 14

Using the following procedure, other phosphates and phosphorothionates were prepared. The compounds so prepared are set forth in Table I.

Phosphates (X=O)

The 4-substiuted - 3 - hydroxy-1,2,5-thiadiazole (100 mmole) was added to a freshly prepared solution of sodium methoxide (100 mmoles) in 250 ml. methanol. The methanol was evaporated and the resulting sodium salt slurried in 250 ml. benzene. The appropriate dialkyl phosphorochloridate (90 mmole) was added and the reaction mixture refluxed until the disappearance of dialkyl phosphorochloridate, monitored by vapor phase chromatography, was complete. The resulting heterogeneous mixture was cooled, filtered, and the benzene solution washed with three 100 ml. portions of water and dried over Na$_2$SO$_4$. Evaporation of solvent yielded the products as light oils. The NMR spectra support the assigned structures.

Phosphorothionates (X=S)

The 4-substituted - 3 - hydroxy-1,2,5-thiadiazole (100 mmole) was added to a freshly prepared solution of sodium methoxide (100 mmoles) in 250 ml. methanol. The methanol was evaporated and the resulting salt slurried in 250 ml. acetonitrile. The appropriate dialkyl phosphorochloridothionate (90 mmole) was added and the reaction mixture refluxed until the disappearance of dialkyl phosphorochloridothionate, monitored by vapor phase chromatography, was complete. The resulting heterogeneous mixture was cooled, filtered, and the acetonitrile evaporated. The resulting residue was dissolved in 250 ml. benzene, washed with three 100 ml. portions of water and dried over Na$_2$SO$_4$. Evaporation of solvent yielded the products as light oils. The NMR spectra support the assigned structures.

TABLE I

| Examples: | Compounds |
|---|---|
| 3 | Dimethyl 1,2,5-thiadiazol-3-yl phosphate. |
| 4 | Dimethyl 1,2,5-thiadiazol-3-yl phosphorothionate. |
| 5 | Diethyl 1,2,5-thiadiazol-3-yl phosphorothionate. |
| 6 | Dimethyl 4-ethoxy-1,2,5-thiadiazol-3-yl phosphate. |
| 7 | Diethyl 4-ethoxy-1,2,5-thiadiazol-3-yl phosphate. |
| 8 | Dimethyl 4-ethoxy-1,2,5-thiadiazol-3-yl phosphorothionate. |
| 9 | Dimethyl 4-chloro-1,2,5-thiadiazol-3-yl phosphate. |
| 10 | Diethyl 4-chloro-1,2,5-thiadiazol-3-yl phosphate. |
| 11 | Dimethyl 4-ethylthio-1,2,5-thiadiazol-3-yl phosphate. |
| 12 | Diethyl 4-ethylthio-1,2,5-thiadiazol-3-yl phosphate. |
| 13 | Dimethyl 4-ethylthio-1,2,5-thiadiazol-3-yl phosphorothionate. |
| 14 | Diethyl 4-ethylthio-1,2,5-thiadiazol-3-yl phosphorothionate. |

INSECTICIDE TESTING METHODS

Dip test

Mexican bean beetle—*Epilachina varivestis* Mulsant.—Lima bean leaves of uniform size are momentarily dipped in a 500 p.p.m. water-acetone solution of the test compound. When dry, the treated leaf is placed in a screened petri dish and exposed to ten fourth instar larvae. The percent mortality is recorded after 48 hours. Compounds that show 90 percent or more mortality are retested at 100 and 10 p.p.m.

Southern armyworm—*Prodenia eridania* Cramer.—This test is carried out as described for the Mexican bean beetle, using ten fourth instar larvae and observing mortality after 48 hours.

Two-spotted spider mite—*Tetranychus telarius* Linnaeus.—Infested trifoliate bean leaves (Henderson bush lima) are selected that have as many as twenty adult mites per leaf. Leaves with mites attached are momentarily dipped into a 500 p.p.m. emulsion, solution, or suspension of the test compound and then placed (petiole only) in a 4 oz. bottle of water for observation. Percent mortality is observed after 72 hours. If 90–100 percent mortality is observed, compounds are retested at 100 and 10 p.p.m.

Spray tests

Housefly—*Musca domestica* Linnaeus.—Adult houseflies are contained in 100 mm. petri dish screened cages and exposed to a spray of 10 ml. acetone solution of the test compound. An initial concentration of 500 p.p.m. is used, with ten flies in each cage. Percent mortality is observed after 24 hours. When over 90 percent mortality is observed, the compound is retested at lower concentrations (100 and 10 p.p.m.).

German cockroach—*Blatella germanic* Linnaeus.—This test is conducted in a manner similar to that used for the housefly. The test specimens are ten cockroaches per screened petri dish.

Bean aphid—*Aphis fabae*.—This test is conducted in a manner similar to that used for the housefly. The test specimens are nasturtium leaves infested with bean aphids.

Boll weevil—*Anthonomus grandis*.—This test is conducted in a manner similar to that used for the housefly. The test specimens are ten boll weevils per screened petri dish.

The compounds of Examples 1 through 14 were subjected to the aforedescribed insecticide testing methods and the results are set forth in Table II. For each compound in Table II, the first test result for each insect is for testing at 500 p.p.m. The second result is at 100 p.p.m., and the third is at 10 p.p.m. The substituents tabulated are for compounds having the generic structure:

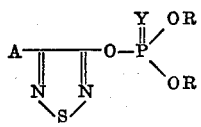

The abbreviations for the insect species (in parentheses) are:

Southern armyworm _____ (SA)
Two-spotted spider mite _____ (SM)
Housefly _____ (HF)
Bean aphid _____ (BA)
Mexican bean beetle _____ (MB)
German cockroach _____ (GC)
Boll weevil _____ (BW)

TABLE II

| Examples | A | Y | R | SA | SM | HF | BA | MB | GC | BW |
|---|---|---|---|---|---|---|---|---|---|---|
| 1 | H | O | Et | 100 | 100 | 100 | 100 | 100 | 100 | 100 |
|   |   |   |   | 60 | 100 | 80 | 50 | 100 | 90 | 40 |
|   |   |   |   | 50 | 80 | 0 | 30 | 80 | 0 | 20 |
| 2 | C | O | Et | 0 | 70 | 100 | 100 | 50 | 70 | 100 |
|   |   |   |   | 0 | 70 | 90 | 80 | 60 | 20 | 30 |
| 3 | H | O | Me | 100 | 100 | 100 | 100 | 100 | 100 | 100 |
|   |   |   |   | 80 | 90 | 100 | 100 | 100 | 50 | 60 |
|   |   |   |   | 60 | 20 | 20 | 20 | 50 | 20 | 0 |
| 4 | H | S | Me | 100 | 90 | 100 | 100 | 90 | 90 | 100 |
|   |   |   |   | 60 | 70 | 90 | 80 | 60 | 0 | 0 |
|   |   |   |   | 80 | 40 | 20 | 20 | 0 | 0 | 0 |
| 5 | H | S | Et | 90 | 80 | 100 | 100 | 100 | 90 | 0 |
|   |   |   |   | 80 | 0 | 40 | 30 | 90 | 10 | 0 |
|   |   |   |   | 60 | 0 | 20 | 10 | 0 | 10 | 0 |
| 6 | OEt | O | Me | 100 | 100 | 100 | 100 | 100 | 100 | 100 |
| 7 | OEt | O | Et | 100 | 100 | 100 | 100 | 100 | 100 | 100 |
| 8 | OEt | S | Me | 100 | 100 | 100 | 100 | 100 | 100 | 100 |
| 9 | OEt | O | Me | 0 | 100 | 100 | 100 | 0 | 70 | 80 |
|   |   |   |   | 0 | 20 | 40 | 100 | 0 | 0 | 0 |
|   |   |   |   | 0 | 20 | 20 | 60 | 0 | 0 | 0 |
| 10 | Cl | O | Et | 90 | 90 | 100 | 100 | 100 | 100 | 90 |
|   |   |   |   | 80 | 100 | 60 | 100 | 20 | 80 | 0 |
|   |   |   |   | 60 | 40 | 20 |   | 20 | 30 | 0 |
| 11 | SEt | O | Me | 0 | 90 | 100 | 100 | 100 | 0 | 0 |
| 12 | SEt | O | Et | 0 | 100 | 100 | 100 | 100 | 0 | 0 |
| 13 | SEt | S | Me | 0 | 100 | 100 | 100 | 0 | 0 | 0 |
| 14 | SEt | S | Et | 0 | 100 | 100 | 100 | 100 | 0 | 0 |

The compounds of this invention have been found to exhibit considerable biological activity and are especially potent insecticides when used against important agricultural pests. These compounds may be used in various ways to achieve biological action. They can be applied per se, as solids, or in vaporized form, but are preferably applied as the toxic components in pesticidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the pesticidal compositions. Non-limiting examples of liquid carriers include water; organic solvents such as alcohols, ketones, amides, and esters; and mineral oils such as kerosene, light oils and medium oils; and vegetable oils such as cottonseed oil. Non-limiting examples of solid carriers include talc, bentonite, diatomaceous earth, pyrophyllite, fuller's earth, gypsum, flours derived from cotton seeds and nut shells, and various natural and synthetic clays having a pH not exceeding about 9.5.

The amount of the compounds of this invention utilized in pesticidal compositions will vary rather widely. It depends to some extent upon the type of composition in which the material is being used, the nature of the condition to be controlled, and the method of application (i.e., spraying, dusting, etc.). In the ultimate pesticidal composition, as applied in the field, pesticide concentrations as low as 0.0001 weight percent of the total composition can be used. In general, compositions as applied, containing about 0.05 weight percent pesticide in either liquid or solid carrier give excellent results. In some cases, however, stronger dosages up to about 10 weight percent may be required.

In practice, pesticidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of pesticide desired for application. Other concentrates can be solutions that can be later diluted, e.g., with kerosene. Thus, it is within the contemplation of this invention to provide pesticidal compositions containing up to about 80 percent, by weight of the composition, of a pesticidal compound of this invention. Accordingly, depending upon whether it is ready for application, or it is in concentrated form, the contemplated pesticidal compositions contain between about 0.0001 percent and about 80 percent, by weight of the composition, of the pesticidal compound of this invention, and a carrier, liquid or solid, as defined hereinbefore.

FUNGICIDAL ACTIVITY

As has been indicated hereinbefore, the specific compound, dimethyl 1,2,5-thiadiazol-3-yl phosphate (Example 3) shows not only insecticidal activity but fungicidal activity as well. In the following example, this compound was tested for fungicidal activity in comparison with its closest homologous compounds. The test procedures used are as follows:

FUNGICIDE SCREENING METHODS

Contact screening method.—(A) Depression slide (spore germination) test (plant fungi)

Compounds are screened at 50 p.p.m. against *Monilinia fructicola* and *Stemphylium sarcinaeforme* and if desired are screened at 10 p.p.m. against all five organisms shown below.

Method of culturing the test organisms: Fungus species *Monilinia fructicola, Stemphylium sarcinaeforme, Alternaria oleracea, Phytophthora capsica* and *Puccinia graminis tritici* are cultured on potato dextrose agar, oat agar, potato dextrose agar, malt agar, and wheat plants, respectively, at room temperature under continuous fluorescent light. Spores growing in 90 mm. petri dishes containing 40 ml. of the respective agar medium or on the wheat host (for *P. graminis tritici*) are ready for the tests after one week.

Method of treatment: Spores are obtained by scraping them from the surface of the cultures with a rubber policeman or bacterial loop and washing them free with distilled water. The spores in suspension are filtered through a thin layer of glass wool to remove bits of mycelium, and freed of soluble extraneous materials by centrifuging and resuspending in distilled water. The spore concentration is adjusted to 10,000 per ml., using a Fuchs-Rosenthal counting chamber.

Washing spores as (described above) eliminates water-soluble agents which might affect germination. However, washed spores of some fungi will not germinate readily in distilled water. A spore germination stimulant of ultra filtered orange juice is prepared by filtering fresh orange juice through cheesecloth and then through fine filter paper. The filtrate is diluted with distilled water to give a 10% solution. Five-ml. portions are placed in 2-dram, screw-capped vials and stored in the freezer until needed. When needed, the 10% solution is again diluted 1:9 and added to the spore solution in equal amounts, giving a stimulant concentration of 0.5%.

One hundred mg. of each test compared is weighed into a 4-dram wide-mouth vial and dissolved in 10 ml. of a volatile solvent (usually acetone) giving a 10,000 p.p.m. concentration. A 50 p.p.m. concentration is prepare by serial dilution.

Two-tenths ml. of the 50 p.p.m. solution is placed in the well of a hollow-ground depression slide. One slide is prepared for each fungus organism. The volatile solvent is allowed to evaporate (15 minutes for acetone) leaving a deposit of the toxicant. Two-tenths ml. of the spore suspension-stimulant mixture is then added to each slide. Slides are placed in large, inverted glass moisture chambers on metal holding racks and the chambers are sealed with water to maintain a high relative humidity of near 100%. Chambers are held at constant room temperature near 24° C.

Method of recording results: After 16 hours, results are taken by counting the number of spores germinating per 50 spores from each of the two slides treated with the compound. The number failing to germinate is recorded as percent spore germination inhibition.

Soil screening method.—(A) Paper cup drench method (primary)

Method of culturing test organisms: Four representative soil fungi *Fusarium oxysporium, Pythium debaryanum, Rhizoctonia solani* and *Sclerotium rolfsii* are maintained on potato dextrose agar, in 20 x 150 mm. test tubes. Inoculum for the tests is increased in 1000 ml. Erlenmeyer flask on a ¼ corn meal-¾ sand mixture (by volume). The medium is saturated with water and sterilized by autoclaving at 15 lbs. pressure for 20 minutes on two successive days. The medium is inoculated by transferring, aseptically a small portion of mycelium from the test tube cultures 14 days prior to using for inoclum.

Method of treatment (50 p.p.m. based on the weight of the soil): An inoculated medium for each of the four soil organisms is prepared as follows: a 14 day old 1000 ml. flask of the corn-meal sand inoculum is used to inoculate 20 ten oz. cups of sterile soil by blending the inoculum and sterile sand for 10 minutes.

The inoculated medium is then placed in 10 oz. wax treated cold drink cups (20 cups of each organism) and treated as follows: A 150 mg. quantity of each candidate fungicide is weighed on the analytical balance and formulated using 10 ml. of acetone and 190 ml. of $H_2O$. A 50 ml. quantity of each chemical formulation is used to drench 1 cup inoculated with each of the 4 fungal organisms. Immediately after the cups are drenched, they are placed in polyethylene bags (1 cup per bag) and held at 70° F. for 14 days.

Method of recording results: After 10 days, each cup is examined for the presence of fungal growth and each compound is rated for the percent inhibition of fungal growth.

In the table, the following abbreviations are used to identify the fungi species used.

M.F. ———————————— *Monilina fructicola.*
S.S. ———————————— *Stemphylium sarcinaeforme.*
F.O. ———————————— *Fusarium oxysporium.*
P.D. ———————————— *Pythium debaryanum.*
R.S. ———————————— *Rhizoctonia solani.*
S.R. ———————————— *Sclerotium rolfsii.*

EXAMPLE 15

Fungicide tests were carried out, using the afore-described methods, on each of compounds A (Examples 3, B, and C) which compounds are as follows:

(A) Dimethyl 1,2,5-thiadiazol-3-yl phosphate
(B) Diethyl 1,2,5-thiadiazol-3-yl phosphate
(C) Dimethyl 1,2,5-thiadiazol-3-yl phosphorothionate The results of fungicidal testing at 50 p.p.m. for each compound are set forth in the following table:

| | Plant Fungi | | Soil fungi | | | |
|---|---|---|---|---|---|---|
| | M.F. | S.S. | F.O. | P.D. | R.S. | S.R. |
| Compound: | | | | | | |
| A | 0 | 50 | 80 | 0 | 0 | 100 |
| B | 0 | 0 | 0 | 0 | 0 | 0 |
| C | 0 | 0 | 0 | 0 | 0 | 0 |

Although the present invention has been described with preferred embodiments, it is to be understood that modifications and variations may be resorted to, without departing from the spirit and scope of this invention, as those skilled in the art will readily understand.

What is claimed is:

1. A method for combatting fungi that comprises applying to said fungi a fungicidally effective amount of dimethyl 1,2,5-thiadiazol-3-yl phosphate.

References Cited

UNITED STATES PATENTS 3,666,768   5/1972   Barker et al. ———— 260—302 E

FOREIGN PATENTS 886,587   11/1962   Great Britain.

STANLEY J. FRIEDMAN, Primary Examiner

A. J. ROBINSON, Assistant Examiner

PO-1050
(5/69)

UNITED STATES PATENT OFFICE
CERTIFICATE OF CORRECTION

Patent No. 3,752,887               Dated August 14, 1973

Inventor(s)  James Billet and Stanley T. D. Gough

It is certified that error appears in the above-identified patent and that said Letters Patent are hereby corrected as shown below:

Column 5, line 42 under A in Table II, Example 2 "C" should be --CN--.

Column 7, line 49 "inoclum" should be --inoculum--.

Signed and sealed this 18th day of December 1973.

(SEAL)
Attest:

EDWARD M. FLETCHER, JR.           RENE D. TEGTMEYER
Attesting Officer                 Acting Commissioner of Patents